(12) United States Patent
Yasuda

(10) Patent No.: US 6,507,588 B1
(45) Date of Patent: Jan. 14, 2003

(54) INTEGRATED SERVICES DIGITAL NETWORK TERMINAL ADAPTER

(75) Inventor: Nobuyuki Yasuda, Tokyo (JP)

(73) Assignee: Nec Corporation, Tokyo (JP)

( * ) Notice: Subject to any disclaimer, the term of this patent is extended or adjusted under 35 U.S.C. 154(b) by 0 days.

(21) Appl. No.: 09/277,660

(22) Filed: Mar. 26, 1999

(30) Foreign Application Priority Data

Mar. 27, 1998 (JP) .......................................... 10-080825

(51) Int. Cl.$^7$ ............................................. H04M 11/00
(52) U.S. Cl. ................ 370/463; 379/93.05; 379/100.15
(58) Field of Search ................................. 370/270, 271, 370/357, 359, 360, 493, 463, 524; 379/93.01, 93.05, 93.06, 100.15, 171, 229, 230, 268, 269, 399, 387

(56) References Cited

U.S. PATENT DOCUMENTS

| | | | |
|---|---|---|---|
| 5,483,530 A | * 1/1996 | Davis et al. | 370/79 |
| 5,680,589 A | * 10/1997 | Klingman | 395/500 |
| 5,721,729 A | * 2/1998 | Klingman | 370/251 |
| 5,815,505 A | * 9/1998 | Mills | 370/522 |
| 5,832,240 A | * 11/1998 | Larsen et al. | 395/285 |
| 5,903,572 A | * 5/1999 | Wright et al. | 370/524 |
| 6,055,245 A | * 4/2000 | Mitchell et al. | 370/493 |
| 6,212,272 B1 | * 4/2001 | Herschler et al. | 379/399 |
| 6,215,868 B1 | * 4/2001 | Inoue | 379/387 |
| 6,347,093 B1 | * 2/2002 | Reine et al. | 370/463 |

\* cited by examiner

*Primary Examiner*—Hassan Kizou
*Assistant Examiner*—Anh-Vu H Ly
(74) *Attorney, Agent, or Firm*—Scully, Scott, Murphy & Presser

(57) ABSTRACT

An integrated services digital network (ISDN) terminal adapter comprises: a terminal adapter board within a personal computer (PC), the terminal adapter (TA) board including a digital signal processor (DSP) for carrying out modulation-demodulation of a modem and data processing for ISDN and a dial access arrangement (DAA) utilizing DSP as a modem function; and a digital service unit (DSU) outside the PC, employing a plurality of analog port interfaces and a plurality of S/T interfaces, the analog port interface and the S/T interface being connected to the TA board and, in addition, performing interfacing with the U point of an ISDN circuit, where various functions of the DSU analog port interface re controlled by a tone generation function of the TA board through a telephony application interface (TAPI) between a communication application and an operating system (OS).

6 Claims, 2 Drawing Sheets

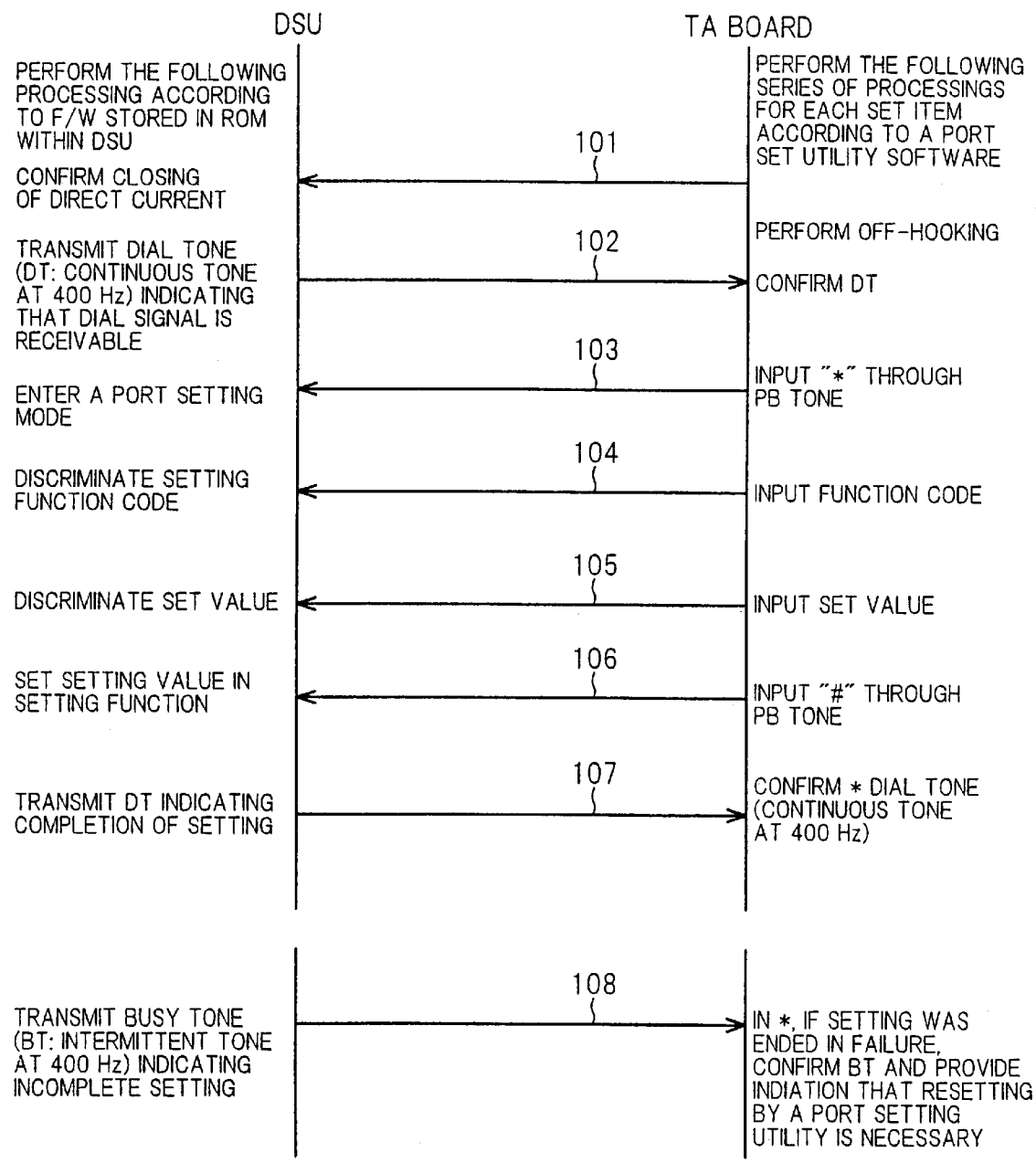

INTEGRATED SERVICES DIGITAL NETWORK TERMINAL ADAPTER

FIELD OF THE INVENTION

The invention relates to an integrated services digital network (hereinafter often referred to as "ISDN") terminal adapter, and more particularly to an ISDN terminal adapter that can realize Internet access using a personal computer (hereinafter referred to as "PC") through ISDN communication.

BACKGROUND OF THE INVENTION

In recent years, a rapidly increasing demand for Internet access has lead to a rapid increase in a shift and a new subscription to ISDN communication by virtue of its advantages including improved access rate and simultaneous utilization of two channels. This also has lead to a rapid increase in demand for a terminal adapter (hereinafter often referred to as "TA") with a built-in digital service unit (hereinafter often referred to as "DSU") that is provided outside the PC body, by virtue of easy setting of various optional functions.

This is because, in order to realize Internet access using PC through ISDN communication, it has hitherto been common practice to use TA with built-in DSU which is provided outside PC. In this case, TA with built-in DSU and PC are connected to each other through an RS-232C cable conforming to V.24 which is physical layer interface standards specified in Telecommunication Standardization Section in International Telecommunication Union (ITU-T). Various optional functions of an analog (A) port and a digital (D) port of TA are set through the RS-232C cable.

In the above construction, optional functions with respect to TA can be easily set. However, wiring within a household is unfavorably complicate due to the form of installation of PC, TA with built-in DSU, and an existing analog telephone connected thereto. Specifically, in many case, in general households, an analog telephone has been disposed at the entrance of a house or in a living room. On the other hand, PC and DSU are not always disposed at the entrance or in the living room and, in many cases, are disposed in a different room provided with a U point interface, such as studies. That is, it is difficult to adopt such a positional relationship that PC and DSU are connected to each other through the RS-232C cable.

More specifically, the ISDN line is one led in the above different room provided with the U point interface where it is connected to TA with built-in DSU which is provided outside PC. Further, TA with built-in DSU in its A port is connected to an analog telephone installed at the entrance or in a living room through the RS-232C cable which has been turned up from the A port. This clearly renders wiring complicate.

A method, which is considered effective for solving this problem, is that DSU is separated from TA and disposed at the entrance or in a living room and the conventional analog telephone on hand is connected to the A port of DSU with DSU being connected to an S/T interface of TA, which has been built in PC, through an S/T interface, thereby simplifying wiring.

In this case, however, optional functions of DSU are set by combining buttons of the analog telephone connected thereto, or by providing a special serial interface on DSU and connecting the special serial interface to PC. Therefore, setting should be performed by connection to a portable PC, such as a notebook-sized PC, rather than PC provided in the separate room. This setting is not easy for users.

When optional functions are set by the analog telephone connected to DSU in its A port, a push button (hereinafter often referred to as "PB") tone signal is output from the analog telephone. In this case, setting functions and setting values are input while consultation with an instruction manual, and, at the same time, setting should be performed while confirming the response from the DSU side through a tone from the telephone receiver. This is troublesome.

Further, it should be noted that, although the rate of increase in the number of subscribers to analog lines has reached the limit, the absolute number of subscribers is as large as 60,000,000 lines. Most of PC users originally use Internet through a modem using the analog communication and, thereafter, shift the analog communication to the ISDN communication according to need.

SUMMARY OF THE INVENTION

The invention has been made under the above circumstances, and it is an object of the invention to provide an ISDN terminal adapter that can simplify wiring and, at the same time, is easy to set.

According to the first feature of the invention, an ISDN terminal adapter comprises: a terminal adapter board loaded into a personal computer, the terminal adapter board comprising at least a processing circuit for carrying out modulation-demodulation of a modem and data processing for ISDN and a network controller utilizing the processing circuit as a modem function; and a digital service unit provided outside the personal computer, the digital service unit comprising a plurality of analog port interfaces and a plurality of S/T interfaces, a set of the analog port interface and the S/T interface being connected to the terminal adapter board and, in addition, performing interfacing with U point of an ISDN line, various optional functions of the analog port interface in the digital service unit being set by utilizing a tone generation function of the processing circuit in the terminal adapter board through a telephony application interface between a communication application and an operating system (OS).

According to the invention, DSU, which has been built in the TA board in the prior art, is separated from the TA board, an analog telephone is connected to the separated DSU, and various optional functions of the analog port interface (A port) of DSU are set by tone generation functions of the processing circuit of the TA board through a telephony application interface (TAPI) between the communication application and the operating system. By virtue of this construction, various optional functions of the A port in DSU can be set remotely from the personal computer in such a state that a place where DSU and the analog telephone is away from a place where the TA board and the personal computer incorporating it are installed.

In this case, the TA board may comprise: a digital signal processor (DSP) comprising a processing circuit for performing modulation-demodulation of a modem and data processing of ISDN; a first S/T chip connected to the S/T interface is DSU; and a dial access arrangement (DAA) for performing network control for the modem function, the TA board serving to receive analog signals from and transmit analog signals to the A port and to receive digital signals from and transmit digital signals to the S/T interface through DSP connected to an internal bus of the personal computer, tone transmission and tone detection using the modem function of the digital signal processor being performed by utilizing OS of the personal computer.

Further, DSU may comprise: computing means comprising a microprocessor (MPU) that performs setting of protocols and various optional functions of ISDN; a subscriber's line circuit (SLIC) for interfacing with the TA board; a receiver for receiving and transmitting the tone, the receiver being connected to the subscriber's line circuit; a gate array (G/A) for interfacing the microprocessor; a module for performing conversion between U point and S/T point with respect to the ISDN line; and a second S/T chip for performing S/T interface connection of S/T point passed through the module to the terminal adapter board.

Furthermore, according to the invention, in order to simplify cable wiring in ordinary households, the TA board and DSU may be connected to each other in such a manner that signal cables for the A port and signal cables for the S/T interface are gathered in a bundle which is seen like a single cable to all appearances.

BRIEF DESCRIPTION OF THE DRAWINGS

The invention will be explained in more detail in conjunction with appended drawings, wherein:

FIG. 2 is a diagram showing setting of optional functions which illustrate the operation of the ISDN terminal adapter according to the preferred embodiment of the invention shown in FIG. 1.

DESCRIPTION OF THE PREFERRED EMBODIMENTS

Figure 1:
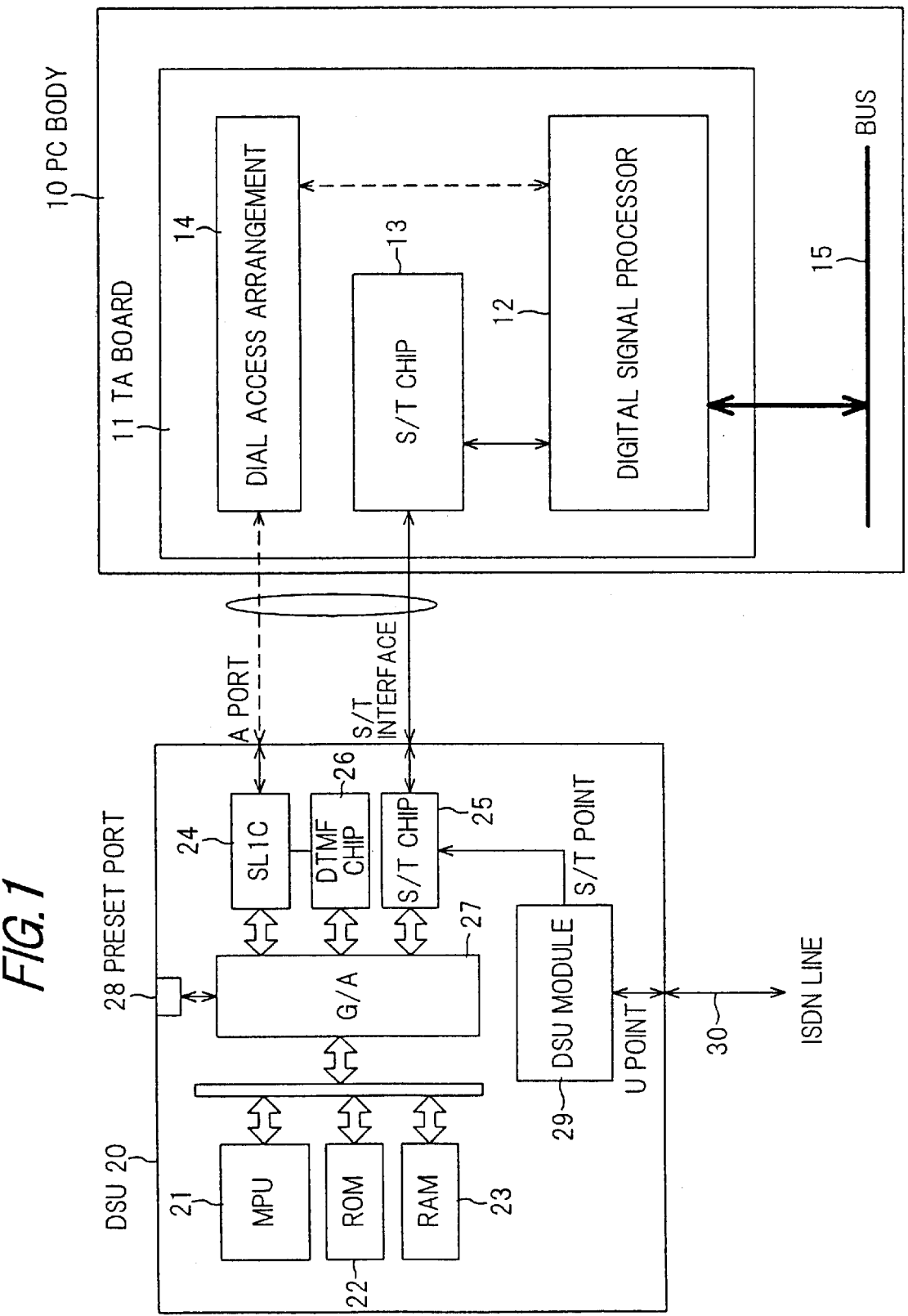
FIG. 1 is a block diagram of an ISDN terminal adapter according to a preferred embodiment of the invention.

Preferred embodiments of the invention will be explained in conjunction with the accompanying drawings. FIG. 1 is a block diagram showing a preferred embodiment of the ISDN terminal adapter according to the invention. The ISDN terminal adapter according to the preferred embodiment of the invention is a DSU separation type TA board, which has been built in PC, that comprises a TA board 11, which has been built in a PC body 10, and DSU 20 provided outside the PC body 10 and separated from TA.

This DSU separation type TA board, which has been built in PC, has a modem function by the conventional DSP and, in addition, TA function of ISDN. For connection to the external DSU 20, connection of the A port interface of DSU 20 in addition to the S/T interface can facilitate setting of optional functions of the A port.

The TA board 11 is connected to a bus 15 within the PC body 10 and comprises: a digital signal processor (DSP) 12 comprising a processing circuit for performing modulation-demodulation of a modem and data processing of ISDN; an S/T chip 13 for interface to the S/T point of the ISDN line 30; and a dial access arrangement (DAA) 14 for performing network control as an analog line interface in the case where DSP 12 is utilized as the modem function. The TA board 11 receives analog signals from and transmits analog signals to the A port of DSU 20 and receives digital signals from and transmits digital signals to the S/T interface through a bus 15 and DSP 12 connected thereto.

In this case, the modem function may be, for example, of cotrollerless type wherein an upper driver controls data that have been modulated or demodulated in DSP 12. By virtue of this, the addition of a driver for ISDN permits TA to provide ordinary modem functions and, at the same time, to operate as TA for ISDN through the S/T interface.

DSU 20 is generally installed at the entrance or in a living room and comprises a plurality of A ports and a plurality of S/T interfaces. Among these A ports and S/T interfaces, a set of the A port and the S/T interface is used for connection to the TA board. DSU 20 per se has such intelligence that a conventional analog telephone on hand is connected to the A port for connection to an analog telephone on the other party side through ISDN and, in addition, a digital telephone or a TA board is connected by using the S/T interface. For realizing the above intelligence, DSU 20 comprises a microprocessor (MPU) 21 for setting protocols of ISDN and various optional functions, a read only memory (ROM) 22 for storing a firmware program (F/W) for executing it, and a random access memory (RAM) 23 as a work area of F/W.

DSU 20 further comprises: a subscriber's line circuit (SLIC) 24 for interface to the TA board 11; an S/T chip 25 for connecting the TA board to the S/T interface; a DTMF chip 26, connected to SLIC 24, for receiving and transmitting a PB tone; a gate array (G/A) 27 for interfacing them to MPU 21; a setting port 28 through which G/A 27 receives RS-232C signals from the exterior or outputs the signals to the exterior for setting of functions of the A port; and a DSU module 29 for performing conversion between U point and S/T point with respect to the ISDN line 30 side.

DSU 20 having the above construction controls layers 1, 2 and 3 of ISDN at the S/T point through the DSU module 29 under control of MPU 21. Further, a modem for the A port within DSU 20 is connected from the TA board 11 through a two-wire signal line to facilitate setting of optional functions of the A port.

Here, optional functions of the A port include global termination setting (setting regarding whether or not the subscriber answers upon incoming of a call to the subscriber's phone number), call waiting setting (setting regarding whether or not the subscriber answers an incoming call during another call, and self-subaddress setting (subaddress phone number or the like). Thus, the A port has these various types of functions. The setting of functions and the setting of parameters are performed by manually inputting a PB tone into the A port of DSU 20 through an external telephone, or by connecting a serial interface (hereinafter referred to as "serial port") of the PC body 10 to a serial port of DSU 20 through a specialty RS-232C cable and starting up a port setting utility software on PC.

According to this embodiment, besides above setting methods, a setting method may be used wherein, in wiring in a separate room, the A port and the S/T interface are gathered in a bundle which is seen like a single cable to all appearances to simplify wiring, a PB tone of the modem is generated using an A port setting utility software on the TA board 11 loaded into the PC body 10, passed through DAA 14 within the TA board 11 and input, through a signal line of the A port in the cable, into the A port within DSU 20 provided at the entrance or in a living room, that is, a place different from the room provided with the PC body 10, and, further, a setting command from PC is analyzed through SLIC 24 by means of a DTMF chip 26 for decoding the PB tone, and optional functions of the A port are set according to the results of the analysis.

As described above, in order to simplify cable wiring of general households, the signal cables for the A port and the signal cables for the S/T interface are gathered in a bundle which is seen like a single cable to all appearances, and this bundle is used between DSU 20 and the TA board 11. The cable at its both ends is distributed to a modular jack of the A port and a modular jack of the S/T interface.

Next, the operation of the preferred embodiment of the invention will be explained by taking, as an example, setting of optional functions of the A port of DSU by transmission of a PB tone as one of the modem functions of the TA board 11 in conjunction with FIG. 2 showing the procedure for setting.

At the outset, an A port setting utility software of the TA board 11 is started up in the PC body 10. Data for each setting item are input according to a guide indicated on a display. Thereafter, the following series of processings between the TA board 11 and the external DSU 20 are performed at a time. In this case, transmission of a PB tone through a command to the modem or the tone detection are performed using a telephony application interface (TAPI) which is one of the functions of the operating system (OS) of PC.

That is, at the outset, in the TA board 11, off-hooking is performed through a command to the modem (step 101). On the other hand, DSU 20 performs the following processing using F/W stored in ROM 22. Specifically, DSU 20, upon confirmation of closing of direct current based on off-hooking of the TA board 11, transmits a dial tone (DT: continuous tone at 400 Hz) indicating that a dial tone can be received (step 102). As soon as DSP 12 detects DT, the TA board 11 judges that there was a response from DSU 20, and then transmits "*" in the form of a PB tone, indicating the entry into the function entry mode, from DSP 12 through DAA14 (step 103).

In DSU 20, a DTMF chip 26 receives the PB tone through the A port and SLIC 24. As soon as MPU 21 receives the notice of the reception through G/A27, the A port setting mode becomes active. Subsequently, the TA board 11 transmits a two-digit function code to the A port of DSU 20 (step 104). DSU 20 recognizes, based on the function code, the function to be set. For example, in the case of the global termination selection function, the TA board 11 transmits "11." The TA board 11 then transmits a setting value for the function (step 105). In the case of the above function, "1" means "not setting," while "2" means "setting." Desired setting is performed according to the guide indicated on the display. When setting of the phone number is contemplated, a number in a plurality of figures is transmitted.

The TA board 11 further transmits "#" in order to notify the completion of setting (step 106). DSU 20 completes setting upon detection of this signal, and transmits DT as the notification to the TA board 11 (step 107). As soon as DSP 12 detects DT through DAA 14, the TA board 11 recognizes that setting has been completed. The above operation is repeated for all the input items of the utility software, and the setting software is finally terminated.

If a setting function or a setting value, which does not meet standards, has been input, DSU 20 transmits a bus tone (BT: intermittent tone at 400 Hz) to the TA board 11 and does not renew the set value (step 108). Upon reception of BT, the TB board 11 displays, through the A port setting utility, an indication that resetting is necessary.

As is apparent from the foregoing description, according to the invention, replacement of a driver software of a personal computer can realize a DSU separation type TA board, which has been built in PC, that functions also as TA of ISDN. Therefore, the system can be used in such a manner as will match the situation of ordinary households. That is, while DSU and an analog telephone on hand connected thereto are installed at the entrance or in a living room, the PC body is installed in a separate room. Items, which have been remotely output from PC through a utility software, are automatically set. This can save a lot of time and labor for setting.

The invention has been described in detail with particular reference to preferred embodiments, but it will be understood that variations and modifications can be effected within the scope of the invention as set forth in the appended claims.

What is claimed is:

1. An integrated services digital network (ISDN) terminal adaptor comprising: a terminal adaptor board loaded into a personal computer, the terminal adaptor board comprising a processing circuit for carrying out modulation-demodulation of a modem and data processing for ISDN and a network controller utilizing the processing circuit as a modem function; and a digital service unit provided outside the personal computer, the digital service unit comprising a plurality of analog port interfaces and a plurality of S/T interfaces, a set of the analog port interface and the S/T interface being connected to the terminal adapter board, and in addition, performing interfacing with the U point of an ISDN line, a plurality of operational functions of the analog port interface in the digital service unit being controlled by a tone generation function of the processing circuit in the terminal adapter board through a telephony application interface between a communication application and an operating system (OS).

2. The ISDN terminal adapter according to claim 1, wherein the terminal adaptor board comprises: a digital signal processor comprising the processing circuit for performing modulation-demodulation of the modem and data processing for ISDN; a first S/T chip connected to the S/T interface in the digital service unit; and a dial access arrangement for performing network control for the modem function, the termal adaptor board serving to receive analog signals from and transmit digital signals to the S/T interface through the digital signal processor connected to an internal bus of the personal computer, tone transmission and tone detection using the modem function of the digital signal processor being performed by the OS of the personal computer.

3. The ISDN terminal adapter according to claim 1, wherein the digital service unit comprises: computing means comprising a microprocessor that performs the setting of protocols and various optional functions of ISDN; a subscriber's line circuit for interfacing with the terminal adapter board; a receiver for receiving and transmitting a tone, the receiver being connected to the subscriber's line circuit; a gate array for interfacing the microprocessor; a module for performing conversion between U point and S/T point with respect to the ISDN circuit; and a second S/T chip for performing S/T interface connection of S/T point passed through the module to the terminal adapter board.

4. The ISDN terminal adapter according to claim 1, wherein the terminal adapter board and the digital service unit are connected to each other such that signal cables for the analog port interface and signal cables for the S/T interface are gathered in a bundle which is seen like a single cable.

5. The ISDN terminal adapter according to claim 1, wherein the terminal adapter board generates a push-button (PB) tone of the modem upon start-up of an analog port utility software program by the personal computer and inputs the PB tone through the network controller into the analog port interface in the digital service unit that analyzes the input PB tone and sets an operational function of the analog port interface according to the results of the analysis.

6. The ISDN terminal adapter according to claim 5, wherein the digital service unit analyzes the PB tone and, when the results of the analysis indicate that an instruction corresponds to a non-standard setting function or a set value, said digital service unit does not renew the set value and transmits a busy tone to the terminal adaptor board.

* * * * *